(12) United States Patent
Onodera

(10) Patent No.: US 6,316,959 B1
(45) Date of Patent: Nov. 13, 2001

(54) SEMICONDUCTOR CIRCUIT HAVING SCAN PATH CIRCUIT

(75) Inventor: Takeshi Onodera, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/652,349

(22) Filed: Aug. 31, 2000

(30) Foreign Application Priority Data

Sep. 3, 1999 (JP) ............................................... P11-249647

(51) Int. Cl.$^7$ .................................................. H03K 19/00
(52) U.S. Cl. .................................. 326/46; 326/8; 326/16; 713/189; 713/168; 380/4; 380/23
(58) Field of Search .................................. 326/8, 16, 46; 713/189, 168; 380/23, 4

(56) References Cited

U.S. PATENT DOCUMENTS

| | | | |
|---|---|---|---|
| 5,719,504 | * | 2/1998 | Yamada .................................... 326/16 |
| 5,774,545 | * | 6/1998 | Raghavachari ............................ 380/4 |
| 5,857,021 | * | 1/1999 | Kataoka et al. .......................... 380/4 |
| 6,072,328 | * | 6/2000 | Takuma .................................... 326/8 |

FOREIGN PATENT DOCUMENTS 0 743 602   11/1996  (EP) .
0 798 620   10/1997  (EP) .

* cited by examiner

*Primary Examiner*—Michael Tokar
*Assistant Examiner*—Vibol Tan
(74) *Attorney, Agent, or Firm*—Frommer Lawrence & Haug LLP; William S. Frommer

(57) ABSTRACT

A semiconductor circuit for compressing or encoding output data of a scan path circuit, able to realize a circuit test and fault analysis by the scan path circuit, and capable of preventing the configuration of a combinational circuit from being guessed from the input and output. Predetermined mode key data is input by being mixed in input data to a scan path circuit during a scan mode operation so as to be fetched by a mode key circuit embedded in the scan path circuit. The mode key data is fetched by the mode holding circuit from the mode key circuit and a mode signal BE is generated in accordance with the mode key data during a system mode operation. When the mode key data has a predetermined pattern, the mode key signal becomes a predetermined set value, and an output signal of the scan path circuit is output as it is in accordance therewith. Otherwise, since the output signal of the scan path circuit is encoded and output, the output of the scan path circuit can be concealed in accordance with need.

10 Claims, 10 Drawing Sheets

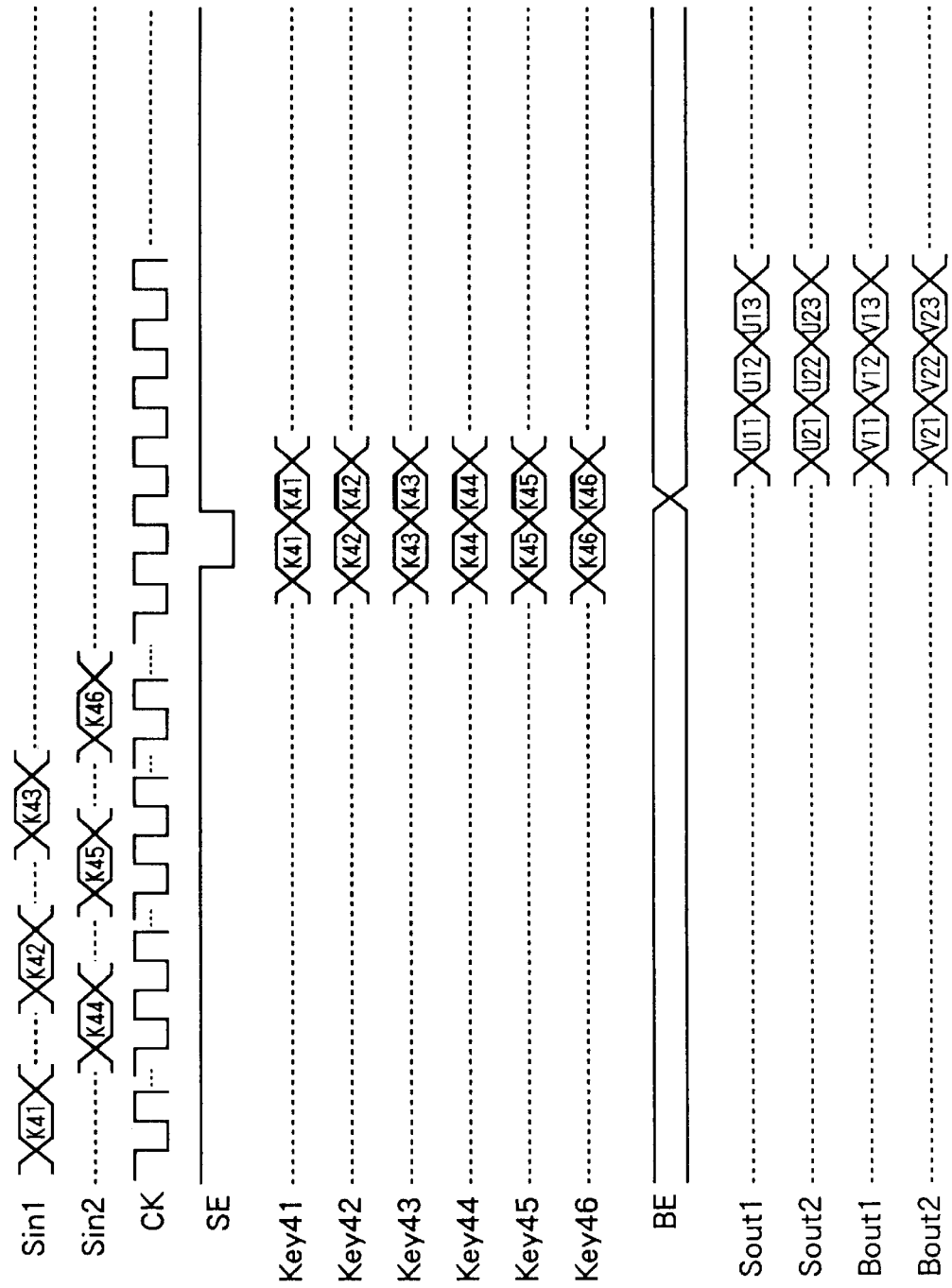

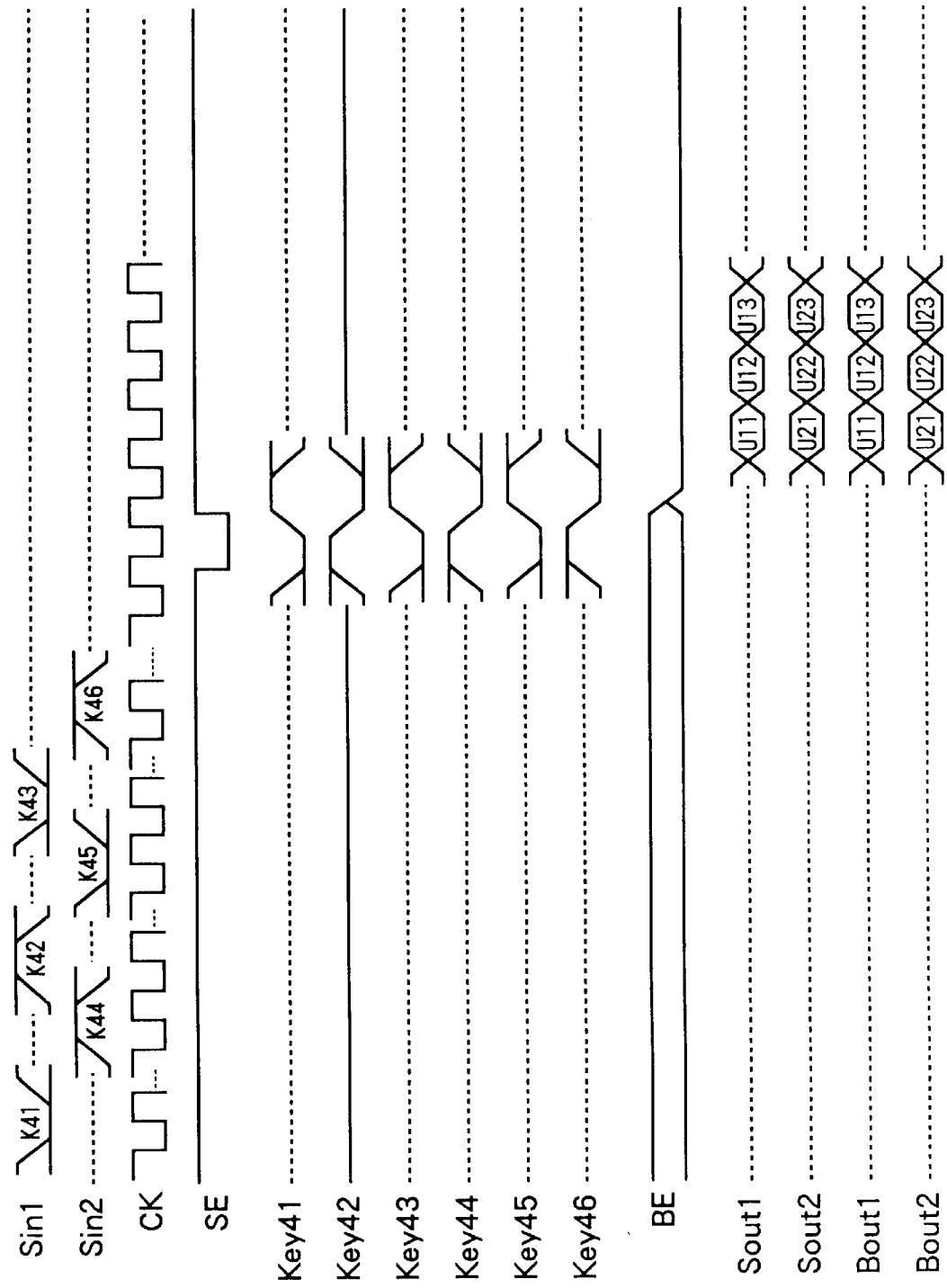

SEMICONDUCTOR CIRCUIT HAVING SCAN PATH CIRCUIT

BACKGROUND OF THE INVENTION

1. Field of the Invention

The present invention relates to a semiconductor circuit including a digital logic circuit and a scan path circuit for performing test and fault analysis of a digital logic circuit using the scan path circuit.

2. Description of the Related

A scan path circuit is installed and used in a semiconductor circuit for the purpose of facilitating preparation of test patterns for production shipment tests of digital logic circuits and facilitating fault analysis of logic circuits. A scan path circuit makes it possible to handle a complex circuit by separating it into flip-flops and combination circuits and to facilitate circuit tests, fault analysis, etc., therefore is currently widely used in LSIs (large-scale integrated circuits) having complex processing and computation functions and including a large scale sequential circuit.

FIG. 1 is a view of an example of a semiconductor circuit including a scan path circuit. As shown in the figure, the semiconductor circuit comprises a combinational circuit C81 and scan path circuits F81 and F82.

The combination circuit C81 performs a predetermined digital signal processing and logical operation in accordance with input data $N_{in}$ and outputs a processing result $N_{out}$.

The scan path circuits F81 and F82 are respectively comprised of a plurality of flip-flops. The flip-flops are controlled by a commonly input scan path enable signal SE and a clock signal CK.

The scan path circuit F81 successively shifts input data $S_{in1}$ to an output side and outputs an output signal $S_{out1}$. A test pattern is formed by the scan path circuit F81 in accordance with the input data $S_{in1}$ for testing an operation of the combinational circuit C81, data of each bit of the test pattern, that is, held data of each flip-flop comprising the scan path circuit F81, is transferred to the combinational circuit C81, and the processing result of the combinational circuit C81 is transferred to the scan path circuit F81 and successively output to the output side by the scan path circuit F81. The scan path circuit F82 operates in the substantially the same way as the scan path circuit F81. Note that the number of scan path circuits provided in the combinational circuit C81 is two in this example, but only one or a plurality of scan path circuits can also be provided.

As explained above, the scan path circuits F81 and F82 are provided other than the combinational circuit C81 having a function of predetermined processing in the semiconductor circuit, and a test pattern is formed by the scan path circuits and supplied to the combinational circuit C81, or a processing result of the combinational circuit C81 is fetched and successively output as serial data. Therefore, a function test and fault analysis etc. of the combinational circuit C81 conducted before shipment become easy and a test and analysis of an LSI having a complex processing function can be efficiently conducted.

In the above conventional semiconductor circuit, it is easy to perform reverse engineering by using a scan path circuit. Reverse engineering means to find the configuration of a logic circuit inside an LSI based on a real LSI or a simulation model. This is liable to lead to violation of intellectual property such as copying others' products. For example, in an LSI using a scan path circuit, any values can be set in a flip-flops and the values of the flip-flops can be freely read, so it is easy to guess how the combinational circuit is configured and how it functions by the input/output data of the flip-flops. Accordingly, the disadvantage arises that manufacturers producing semiconductor circuits have to take steps to prevent reverse engineering such as stopping using scan path circuits or relying on built-in self-tests (BIST) etc.

FIG. 2 is a view of an example of a semiconductor circuit having a built-in self-test function. As shown in the figure, the semiconductor circuit comprises a combinational circuit C91, a pseudo random number generating circuit B91, a data compression circuit B92, and scan path circuits F91 and F92. Here, the combinational circuit C91 and the scan path circuits F91 and F92 are substantially the same as the respective circuits of the semiconductor circuit shown in FIG. 1. The pseudo random number generating circuit B91 and the data compression circuit B92 will be explained below.

The pseudo random number generating circuit B91 generates a pseudo random number string in accordance with input signals $S_{in1}$ and $S_{in2}$ and inputs the generated pseudo random number string to the scan path circuits F91 and F92. FIG. 3 shows an example of the configuration of the pseudo random number generating circuit B91. As shown in the figure, the pseudo random number generating circuit B91 comprises n number (n is a natural number) of flip-flops connected in series and a logic gate. An exclusive OR of output data of a predetermined flip-flop is fed back to the first flip-flop. A pseudo random number string having a period of $(2^n-1)$ is generated by the pseudo random number generating circuit B91 configured in this way. The data $S_{in1}$ and $S_{in2}$ input from the outside are input to the first and second flip-flops F101 and F102 via exclusive OR circuits XOR1 and XOR2, so an initial value of a pseudo random number string generated by the pseudo random number generating circuit B91 is set in accordance with the input data. Further, data $B_{in1}$ and $B_{in2}$ are output from the output terminals of the exclusive OR circuits XOR1 and XOR2 and respectively supplied to scan path circuits F91 and F92.

The scan path circuits F91 and F92 are configured by a plurality of flip-flops connected in series, respectively, in substantially the same way as in the scan path circuits F81 and F82 in the semiconductor circuit in FIG. 1. The input data is successively shifted to the output side by the scan path circuits. The data $B_{in1}$ and $B_{in2}$ input from the pseudo random number generating circuit B91 are successively shifted by the scan path circuits F91 and F92 to form a test pattern. Then, the test pattern formed in the scan path circuit F91 or F92 is transferred to the combinational circuit C91, a predetermined processing is performed in accordance with the input test pattern in the combinational circuit C91, and the processing result is transferred to the scan path circuits F91 and F92.

The data compression circuit B92 compresses data input from the scan path circuits F91 and F92 and outputs compressed data strings $B_{out1}$ and $B_{out2}$.

As a result, it becomes impossible to set any value to the combinational circuit C91 via the scan paths circuits F91 and F92 or to freely read data from the scan path circuits F91 and F92, so reverse engineering becomes difficult.

A semiconductor circuit having the above built-in self-test function, however, has the following disadvantages. First, since the test data string input to the combinational circuit is a pseudo random pattern generated from a pseudo random number string, the fault detection rate is low in many cases. Next, since the output response data string is output compressed by the data compression circuit, it is difficult to guess the faulty part even if detecting a fault.

Furthermore, tests of the peripheral circuits around the core cell are difficult. Advances in processes for miniaturization of LSIs have led to frequent design of new LSIs by using former LSIs as existing blocks, called "core cells", and combining the core cells. When using a built-in self-test circuit, since the signal input to the core cell is ignored, it cannot be used for testing core cell peripheral circuits. It is possible to provide a scan path mode in the built-in self-test circuit and test core cell peripheral circuits by this scan path mode, but this cannot be used in view of the need to prevent reverse engineering.

SUMMARY OF THE INVENTION

The present invention was made in consideration with such a circumstance and has as an object thereof to provide a semiconductor circuit capable of realizing a circuit test and fault analysis by a scan path circuit and preventing the configuration of a combinational circuit from being guessed from the input and output by compressing or encoding the output data of the scan path circuit.

To achieve the above object, the semiconductor circuit of the present invention is a semiconductor circuit comprising a scan path circuit for successively shifting input data to an output side and a function circuit for performing predetermined processing in accordance with said input data or test data input from said scan path circuit and outputting a processing result to said scan path circuit, comprising a mode key circuit installed at a predetermined position of said scan path circuit for outputting in parallel serial data input to said scan path circuit; a mode signal generation circuit for performing a predetermined logical operation on output data from said mode key circuit and outputting a mode signal in accordance with an operation result; and a data conversion circuit for outputting the output data of said scan path circuit as it is when said mode signal is in one state, while performing predetermined processing on the output data of said scan path circuit and outputting different data from the input data when said mode signal is in a state different from said one state.

Also, in the present invention, preferably, said scan path circuit comprises a plurality of flip-flops connected in series between an input terminal and an output terminal and successively shifting data to be input to said input terminal to said output terminal in accordance with a common clock signal and said mode key circuit is comprised of a plurality of flip-flops installed at predetermined positions of said scan path circuit.

Also, in the present invention, preferably, said mode signal generation circuit comprises a data holding circuit for holding output data of said mode key circuit and a logical operation circuit for performing a predetermined logical operation on the held data of the above data holding circuit and outputting the calculation result as said mode signal, said data holding circuit comprises flip-flops for holding the output data of said mode key circuit, when operating in said first operation mode, said flip-flops hold the output data as they, and when operating in said second operation mode, said flip-flops fetch the output data of said mode key circuit.

Also, in the present invention, preferably, said data conversion circuit comprises a plurality of flip-flops connected in series, a feedback circuit for performing a logical operation on the output data of a predetermined flip-flop among said plurality of flip-flops and inputting the calculation result to a first flip-flop, and an output circuit for outputting the output data of said scan path circuit as it is when said mode signal is in the one state, while outputting a logical operation result of the output data of said scan path circuit and the output data of any flip-flop among said plurality of flip-flops when said mode signal is in a state different from the one state.

According to the present invention, the mode key circuit is configured by a plurality of flip-flops installed at predetermined positions of a scan path circuit, and data to be input to the scan path circuit is fetched by a mode key circuit and input to a mode signal generation circuit. Thus, by mixing predetermined mode key data with the input data of the scan path circuit for input, mode key data having a predetermined pattern is input to the mode signal generation circuit. The mode signal generation circuit generates a mode signal based on a predetermined logical operation in accordance with the data input from the mode key circuit. When the mode key data has a predetermined pattern, a mode signal in a predetermined state is output by the mode signal generation circuit.

The data conversion circuit controls whether to output data of the scan path circuit as it is or to output the data converted in accordance with the mode signal. For example, data encoded by an exclusive OR of the output data of the scan path circuit and a random number string is output by the data conversion.

Accordingly, in the semiconductor circuit of the present invention, an output signal of the scan path circuit is converted by the data conversion circuit and, for example, encoded for output, so the output data can be concealed and it becomes difficult to guess the configuration of the combinational circuit from the output data. On the other hand, by inputting mode key data having a predetermined pattern to the scan path circuit, the mode signal is set to a predetermined state and the output data of the scan path signal is output as it is without being converted, thus it is possible to test the combinational circuit and analysis fault by the output data.

BRIEF DESCRIPTION OF THE DRAWINGS

These and other objects and features of the present invention will become clearer from the following description of the preferred embodiments given with reference to the accompanying drawings, in which:

FIG. 9 is a waveform diagram of an operation of a semiconductor circuit of the present embodiment; and FIG. 10 is a waveform diagram of an operation of the semiconductor circuit when specific mode key data is input.

DESCRIPTION OF THE PREFERRED EMBODIMENTS

Below, preferred embodiments will be described with reference to the accompanying drawings.

Figure 4:
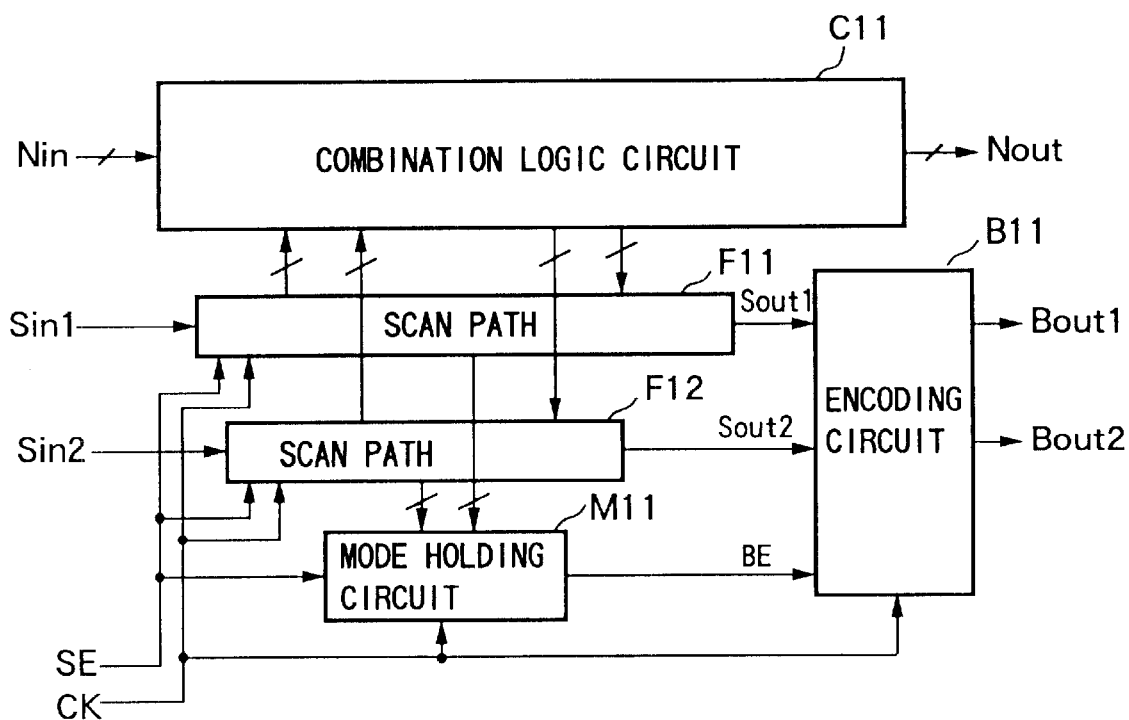
FIG. 4 is a circuit diagram of an embodiment of a semiconductor circuit according to the present invention.

FIG. 4 is a circuit diagram of an embodiment of a semiconductor circuit according to the present invention.

As shown in the figure, a semiconductor circuit of the present invention comprises a combinational circuit C11, scan path circuits F11 and F12, an encoding circuit B11, and a mode holding circuit M11.

The combinational circuit C11 performs a predetermined digital signal processing and logical operation in accordance with input data $N_{in}$ and outputs the processing result $N_{out}$. Furthermore, the combinational circuit C11 receives as input test data from the scan path circuits F11 and F12, performs predetermined processing in accordance with the input data, and transfers the processing result to the scan path circuits F11 and F12.

The scan path circuits F11 and F12 are comprised for example by a plurality of flip-flops connected in series and successively shift input data to the output side. Test patterns are respectively formed in accordance with the data $S_{in1}$ and $S_{in2}$ input from the scan path circuits and transferred to the combinational circuit C11. Also, the processing result is input from the combinational circuit C11, where the input data are shifted and supplied to the encoding circuit B11 as output data $S_{out1}$ and $S_{out2}$.

Figure 5:
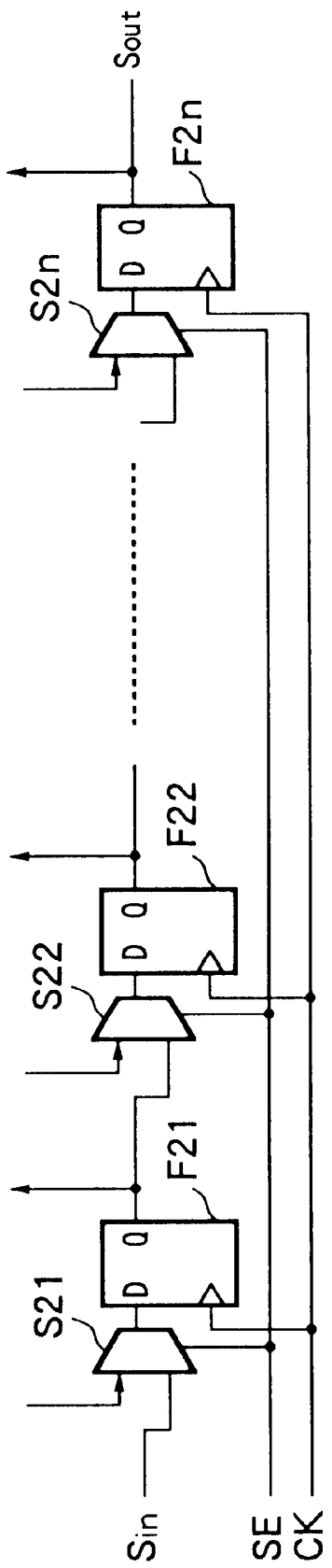
FIG. 5 is a circuit diagram of an example of the configuration of a scan path circuit.

The scan path circuits F11 and F12 have substantially the same configuration, so FIG. 5 shows an example of the configuration. As shown in the figure, the scan path circuit F11 or F12 is comprised of n (n is a natural number) number of flip-flops (for example, D-flip-flops) F21, F22, ..., F2n connected in series. The flip-flops are controlled in operational timing by a clock signal CK. Furthermore, selectors S21, S22, ..., S2n are respectively provided for F21, F22, ..., F2n.

One input terminal of the each of the selectors is connected to an output terminal of the preceding flip-flop, while the other terminal is connected to the output terminal of the combinational circuit C11. Note that one input terminal of the first selector S21 is connected to an input terminal of the data $S_{in}$. The selectors S21, S22, ..., S2n select and output any input signal in accordance with a scan enable signal SE. For example, when a semiconductor circuit operates in a system operation mode (signal SE=0), the selectors select output data from the combinational circuit C11 and output it to the flip-flops. On the other hand, when the semiconductor circuit operates in a scan mode (signal SE=1), the selectors other than the first one select output data of the preceding flip-flops, while the first selector S21 selects the input data $S_{in}$.

Input terminals of the flip-flops F21, F22, ..., F2n are connected to output terminals of the selectors S21, S22, ..., S2n. Furthermore, output terminals of the flip-flops F21, F22, ..., F2n are connected to input terminals of the combinational circuit C11.

When operating in a scan mode, the scan path circuit F11 or F12 successively receives as input the data $S_{in1}$ or $S_{in2}$ input from the input terminal and shifts it to the output side. Therefore, test patterns are formed by the scan path circuits F11 or F12 in accordance with the input data $S_{in1}$ or $S_{in2}$.

When operating in a system mode, the scan path circuit F11 or F12 exchanges signals with the combinational circuit C11. Namely, the test pattern formed in the scan path circuit F12 or F12 is input to the combinational circuit C11, predetermined processing is performed in accordance with the test pattern input from the combinational circuit C11, and the processing result is transferred to the scan path circuit F11 or F12.

By operating the semiconductor circuit in the scan mode again after operating in the system mode, data input to the scan path circuits F11 and F12 are successively shifted to the output side and supplied to the encoding circuit B11.

Figure 6:
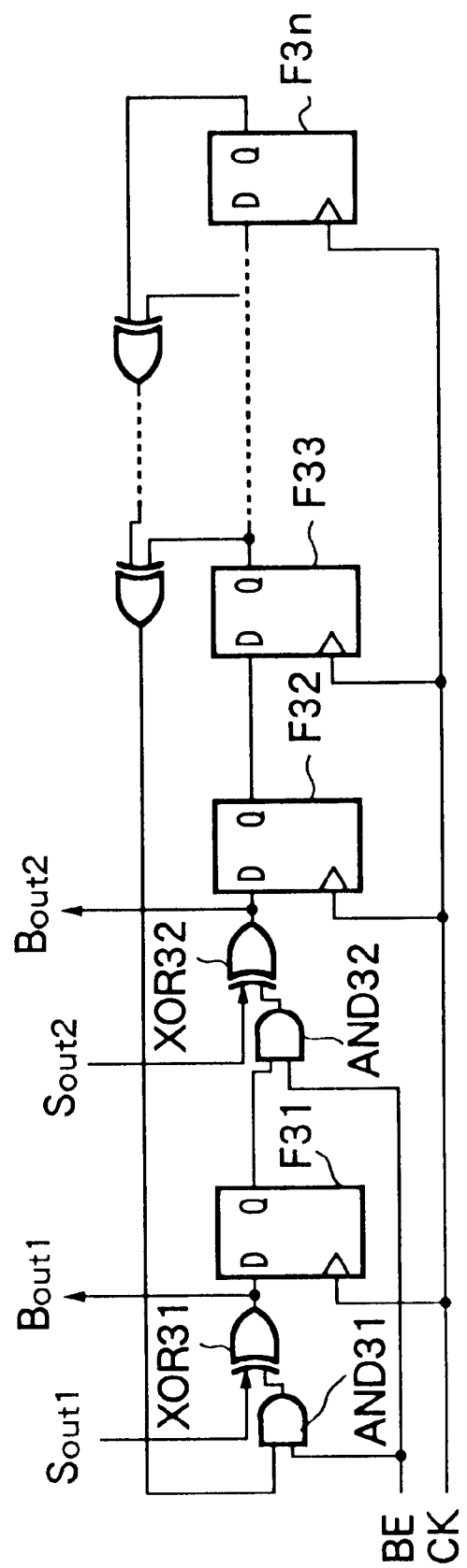
FIG. 6 is a circuit diagram of an example of the configuration of an encoding circuit.

The encoding circuit B11 comprises, as shown in FIG. 6, n number of flip-flops F31, F32, ..., F3n connected in series.

An input terminal of the first flip-flop is connected to an output terminal of an exclusive OR circuit XOR31, and an input terminal of the second flip-flop F32 is connected to an output terminal of the exclusive OR circuit XOR32. Data $S_{out1}$ from the scan path circuit F11 is input to one input terminal of the exclusive OR circuit XOR31, while an output signal of an AND gate AND31 is input to the other input terminal. A feedback signal is input to one input terminal of the AND gate AND31, while a mode signal BE is input to the other input terminal. Note that the feedback signal input to the AND gate AND31 is generated by an exclusive OR of an output signal of a predetermined flip-flop.

Data $S_{out2}$ from the scan path circuit F12 is input to one input terminal of the exclusive OR circuit XOR32, while an output signal of the AND gate ANDS32 is input to the other input terminal. An output signal of the first flip-flop F31 is input to one input terminal of the AND gate AND32, while a mode signal BE is input to the other input terminal.

Encoded signals $B_{out1}$ and $B_{out2}$ are output from the output terminals of the exclusive OR circuits XOR31 and XOR32. Accordingly, the encoded signals $B_{out1}$ and $B_{out2}$ become the results of an exclusive OR operation of the output signals $S_{out1}$ and $S_{out2}$ of the scan path circuits F11 and F12 with pseudo random number strings.

The output signals $B_{out1}$ and $B_{out2}$ are controlled by the above encoding circuit B11 in accordance with the mode signal BE. For example, when the mode signal BE=0, the output signal $S_{out1}$ from the scan path circuit F11 is output as it is as the signal $B_{out1}$, and the output signal $S_{out2}$ from the scan path circuit F12 is output as it is as the signal $B_{out2}$. On the other hand, when the mode signal BE=1, signals obtained by encoding the output signals $S_{out1}$ and $S_{out2}$ of the scan path circuits F11 and F12 by an LFSR (linear feedback shift register) comprised of the flip-flops F31, F32, ..., F3n and the exclusive OR circuit are output.

Figure 7:
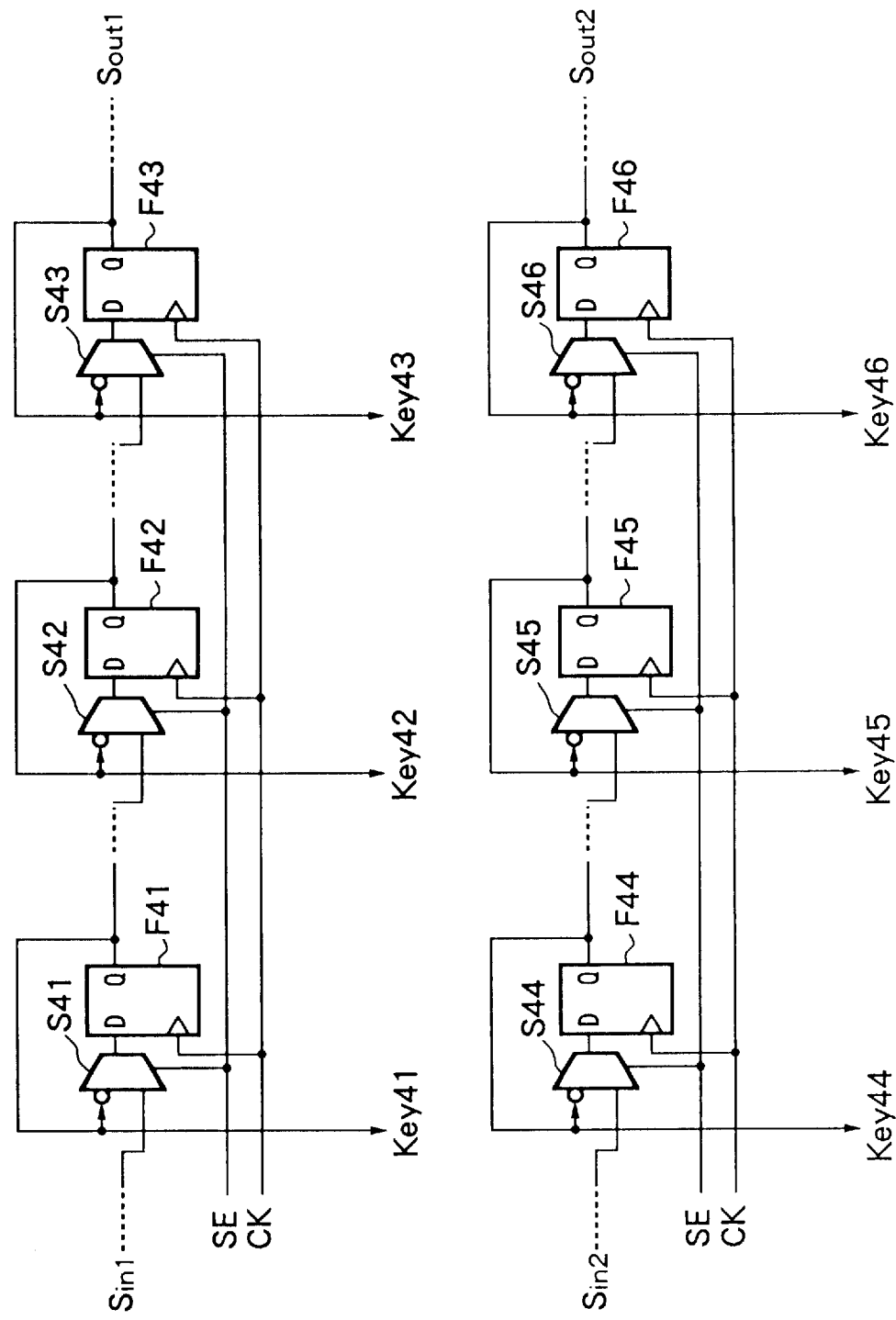
FIG. 7 is a circuit diagram of an example of the configuration of a mode key circuit.
Figure 8:
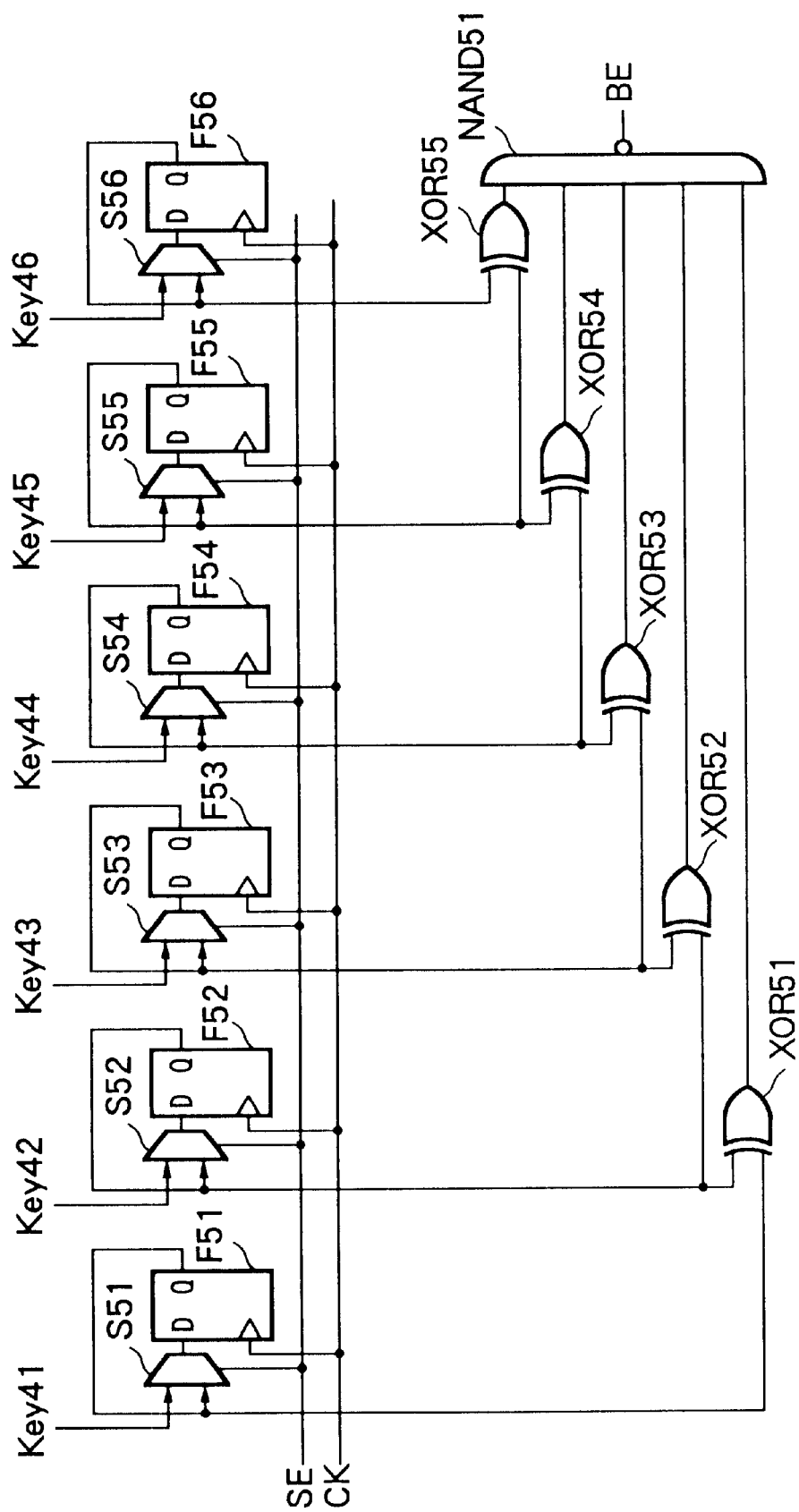
FIG. 8 is a circuit diagram of an example of the configuration of a mode holding circuit.

Next, a generation circuit of the mode signal BE will be explained. The mode signal BE is configured by a mode key MK11 installed in the scan path circuits F11 and F12 and a mode holding circuit M11 shown in FIG. 4. FIGS. 7 and 8 show the configuration of the mode key circuit MK11 and the mode holding circuit M11, respectively.

As shown in FIG. 7, the mode key circuit MK11 is configured by a plurality of flip-flops and selectors provided at the input sides of the flip-flops. Here, a mode key circuit MK11 comprised of six flip-flops F41, F42, ..., F46 will be explained as an example for convenience.

Figure 1:
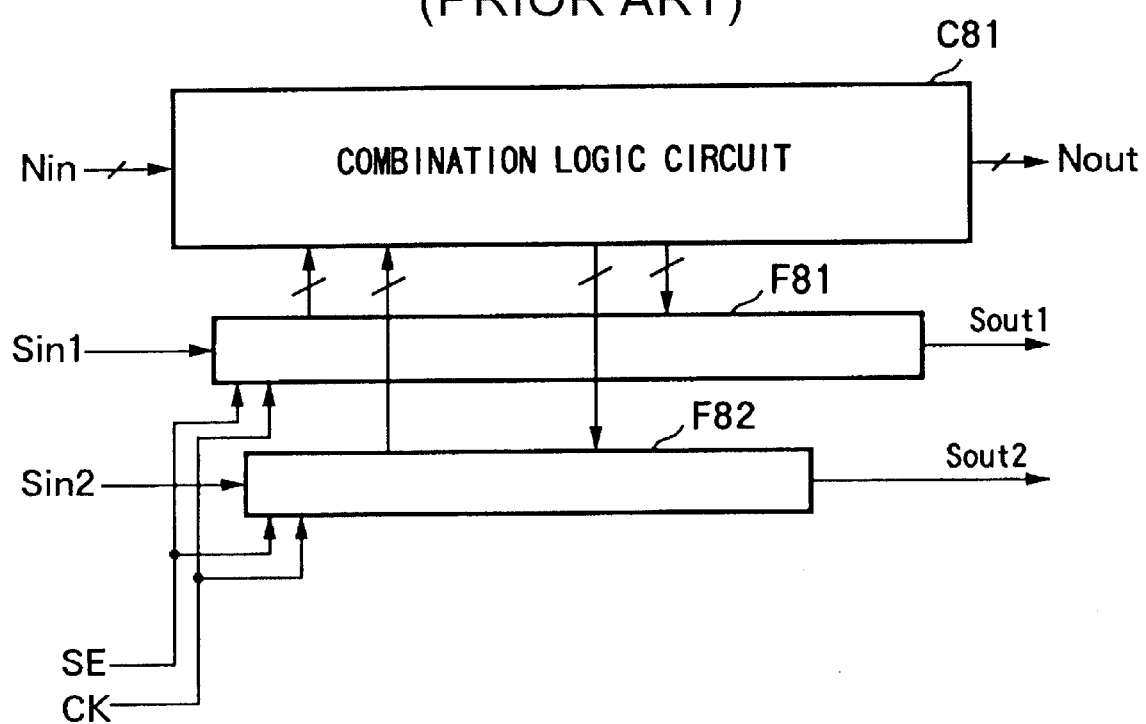
FIG. 1 is a circuit diagram of an example of a semiconductor circuit having a conventional scan path circuit.
Figure 2:
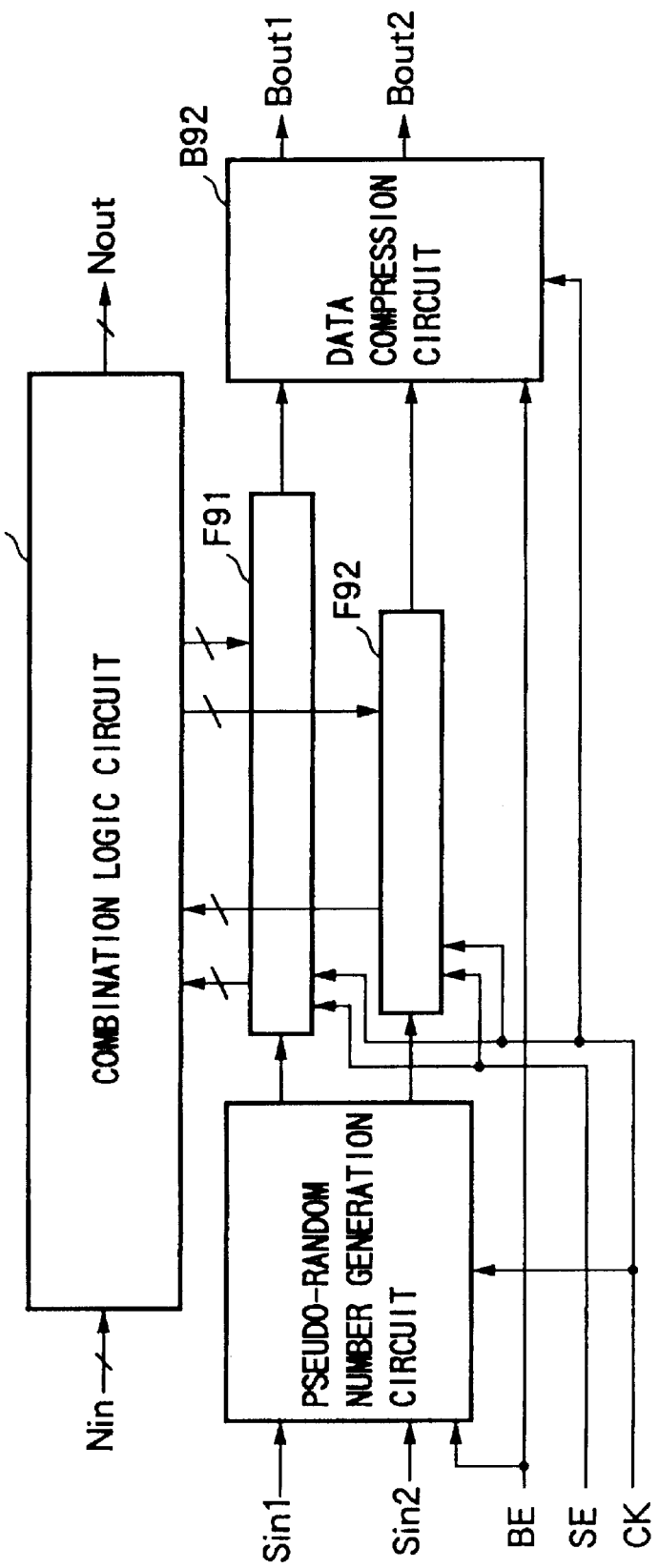
FIG. 2 is a circuit diagram of an example of a semiconductor circuit provided with a self-test function.
Figure 3:
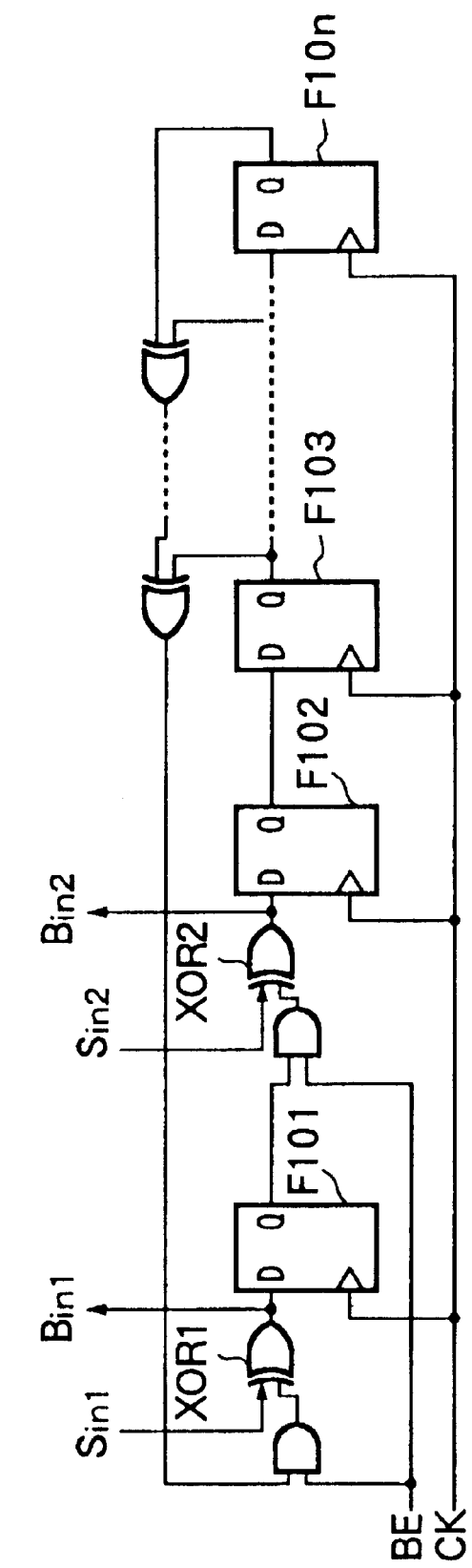
FIG. 3 is a circuit diagram of an example of a pseudo random number generation circuit.

The flip-flops F41, F42, and F43 are embedded in any part of the scan path circuit F11 shown in FIG. 1, while the flip-flops F44, F45, and F46 are embedded in any part of the scan path circuit F12.

One input terminal of the selector S41 is connected to an output terminal of the preceding flip-flop, while the other input terminal (inverted input terminal) is connected to an output terminal of the flip-flop F41. An output terminal of the selector S41 is connected to a data input terminal of the flip-flop F41.

The selector S41 selects an input signal in accordance with a scan enable signal SE and outputs its to the flip-flop F41. For example, when the semiconductor circuit operates in the s can operation mode (SE=1), the selector S41 selects the preceding output signal and supplies it to the flip-flops 41. On the other hand, when the semiconductor circuit operates in the system mode (SE=0), the selector S41 selects inverted data of the held data of the flip-flop F41 and supplies it to the flip-flop F41.

The other selectors S42, S43, . . . , S46 and the flip-flops F42, F43, . . . , F46 comprising the mode key circuit MK11 are connected in substantially the same way as the selector S41 and the flip-flop F41. The selectors select input signals in accordance with the scan enable signal SE and supply them to the flip-flops. Therefore, in the mode key circuit MK11, when operating in the scan mode, the flip-flops F41 to F46 successively shift the input signals $S_{in1}$ and $S_{in2}$ to the output side as flip-flops comprising the scan path circuits F11 and F12. When operating in the system mode, inverted values of the held values of the flip-flops F41 to F46 are fetched from the data input. The output data of the flip-flops F41 to F46. namely, key data key41, key42, . . . , key46, are respectively supplied to the mode holding circuit M11.

As shown in FIG. 8. the mode holding circuit M11 is comprised of flip-flops F51, F52, . . . , F56, selectors S51, S52, . . . , S56, exclusive OR circuits XOR51, XOR52, . . . , XOR55 and a NAND gate NAND51.

One input terminal of the selector S51 is connected to an output terminal of the key data key41, and the other input terminal is connected to an output terminal of the flip-flop F51. A data input terminal of the flip-flop F51 is connected to an output terminal of the selector S51. The selector S51 selects an input signal in accordance with the scan enable signal SE and outputs it to the flip-flop F51. For example, when the semiconductor circuit operates in the system mode (SE=0), the selector S51 selects the key data key41 and outputs it to the flip-flop F51. On the other hand, when in the scan mode (SE=1), the selector S51 selects output data of the flip-flop F51 and supplies it to the flip-flop F51. Namely, the flip-flop F51 in this case continues holding the data fetched when in the system mode operation.

The other selectors S52 to S56 and the flip-flops F52 to F56 are connected in substantially the same way as the selector S51 and flip-flop F51. By the selectors and the flip-flops, the key data key 42 to key 46 output from the mode key circuit MK11 are respectively fetched by the flip-flops during the system operation. In the scan mode, data fetched by the flip-flops in the system mode is held.

One input terminal of the exclusive OR circuit XOR51 is connected to an output terminal of the flip-flop F51, while the other input terminal is connected to an output terminal of the flip-flop F52. Input terminals of the exclusive OR circuits XOR52, XOR53, . . . , XOR55 are connected to the output terminals of the adjacent two flip-flops in substantially the same way.

An input terminal of the NAND gate NAND51 is connected to output terminals of the exclusive OR circuits XOR51 to XOR55, and a mode signal BE is output from the output terminals.

In the above mode holding circuit M11, the mode signal BE=0 is output only when the held data of the flip-flops F51 to F56 are "010101" or "101010", while otherwise, the mode signal BE=1 is output.

The mode signal BE generated by the mode holding circuit M11 is input to the encoding circuit B11 shown in FIG. 6. When the mode signal BE=0, the output signals $S_{out1}$ and $S_{out2}$ of the scan path circuits F11 and F12 are output as they are, while when the mode signal BE=1, the output signals $S_{out1}$ and $S_{out2}$ of the scan path circuits F11 and F12 are encoded. and the encoded signals $B_{out1}$ and $B_{out2}$ are output.

Namely, in the semiconductor circuit of the present embodiment, the mode key is set via the scan path circuit. Whether the output data of the scan path circuit is output as it is or is encoded for output is controlled in accordance with the value of the mode key.

FIG. 9 and FIG. 10 are waveform diagrams of the operation of a semiconductor circuit of the present embodiment. Below, the operation of the semiconductor circuit of the present embodiment will be explained in detail with reference to the waveform diagrams.

As shown in FIG. 9, when operating in the scan mode (SE=1). the input data $S_{in1}$ and $S_{in2}$ of the scan path circuits are successively fetched by the scan path circuits F11 and F12 and shifted to the output side in synchronization with a clock signal CK. At this time, as shown in FIG. 9. the mode key data K41, K42, . . . , K46 are scanned in and fetched by the mode key circuit MK11 mixed in a test pattern for testing the combinational circuit C11 of the semiconductor circuit. Then, when the scanning mode operation is completed, key data key41 to key46 output from the mode key circuit MK11 become K41 to K46, respectively.

Next, a scan enable signal SE is set to "0", whereby the semiconductor circuit operates in the system mode. At this time, data K41 to K46 input to the flip-flops are held by the mode holding circuit M11 shown in FIG. 8. Then, a mode signal BE is output in accordance with the held data. Simultaneously, flip-flops other than the flip-flops comprising the mode key circuit M11 in the scan path circuit fetch the output data of the combinational circuit C11.

Finally, the scan enable signal SE is set to "1" again, whereby the semiconductor circuit operates in the scan mode. At this time, the values of the flip-flops in the scan path circuits F11 and F12 are successively shifted to the output side of the scan path circuit in synchronization with a clock signal CK and output as output data $S_{out1}$ and $S_{out2}$. The output data $S_{out1}$ and $S_{out2}$ of the scan path circuit are input to the encoding circuit B11. As a result, encoded data V11 to V13 and V21 to V23 are successively output from the encoding circuit B11.

FIG. 10 is a waveform diagram of the operation in a case where the mode key data input to the mode key circuit MK11 has a specific value of "010101". As shown in the figure, during a scan mode operation (SE=1), the input data K41, K42, and K43 of specific positions of the input data $S_{in}$ of the scan path circuit F11 are "010", and input data K44, K45, and K46 of specific positions of the input data $S_{in2}$ of the scan path circuit F12 are "101". Accordingly, data "010101" is held in the flip-flops of the mode key circuit MK11.

Since the input data of the mode key circuit MK11 is fetched by the mode holding circuit M11 during the system mode operation (SE=0), the held data of the mode holding circuit M11 becomes "010101". Since a mode signal BE is generated by the mode holding circuit M11 in accordance with the held data "010101", a mode signal of BE=0 is output at this time. Even when returning to the scan mode (SE=1), since the mode signal BE=0 is held by the mode holding circuit M11, the data $S_{out1}$ and $S_{out2}$ input to the encoding circuit B11 are not encoded and are output as when they are input.

As explained above, according to the present embodiment, by inputting a predetermined mode key data mixed in the input data to the scan path circuit during the scan mode, the mode key data is fetched by the mode key circuit embedded in the scan path circuit. When operating in the system mode, the mode key data is fetched by the mode holding circuit from the mode key circuit and a mode signal BE is generated in accordance with the mode key data. When the mode key data has a predetermined pattern, the mode signal BE becomes a predetermined set value and an output signal of the scan path circuit is output as it is in accordance therewith. In other cases, the mode signal BE becomes different from the predetermined set value, so the output signal of the scan path circuit is encoded by the encoding circuit connected to the output side and output. Therefore, the output of the scan path circuit can be concealed in accordance with need, it becomes difficult to guess the configuration of the combinational circuit from the output of the scan path circuit, and therefore reverse engineering can be prevented.

Note that in the present invention, the number of the scan path circuits, the number of flip-flops comprising the scan path circuit positions, the positions and order of the flip-flops of the mode key circuit embedded in the scan path circuit, the number of bits of the mode key data, and the number of bits of the encoding circuit are all variable. Also, the modes of passing the scan output signal can be set freely at the time when the encoding format of the encoding circuit and mode key data match. Furthermore, a compression circuit can be used instead of the encoding circuit for encoding the output signal of the scan path circuit.

As explained above, according to a semiconductor circuit of the present invention, since an output signal of a scan path circuit is compressed or encoded, it becomes difficult to guess the configuration of a combinational circuit from the output of the scan path circuit and therefore reverse engineering can be prevented.

Also, by inputting specific mode key data in a mode key circuit embedded in the scan path circuit, the output signal of the scan path circuit can be output in series without passing through a compression circuit or an encoding circuit. Therefore, the scan path circuit can be used for guessing the position of a fault at the time of a test and fault analysis of a combinational circuit.

Furthermore, the mode key data is variable in length and can be inserted in any position in the scan path and the procedure of setting the mode data is performed during a scanning-in operation, so there is the advantage that someone who does not know the mode key would find it extremely difficult to guess the mode key from the test pattern or even if comparing the two.

While the invention has been described with reference to specific embodiment chosen for purpose of illustration, it should be apparent that numerous modifications could be made thereto by those skilled in the art without departing from the basic concept and scope of the invention.

What is claimed is:

1. A semiconductor circuit comprising a scan path circuit for successively shifting input data to an output side and a function circuit for performing predetermined processing in accordance with said input data or test data input from said scan path circuit and outputting a processing result to said scan path circuit, comprising:
   a mode key circuit installed at a predetermined position of said scan path circuit for outputting in parallel serial data input to said scan path circuit;
   a mode signal generation circuit for performing a predetermined logical operation on output data from said mode key circuit and outputting a mode signal in accordance with an operation result; and
   a data conversion circuit for outputting the output data of said scan path circuit as it is when said mode signal is in one state, while performing predetermined processing on the output data of said scan path circuit and outputting different data from-the input data when said mode signal is in a state different from said one state.

2. A semiconductor circuit as set forth in claim 1, wherein said scan path circuit comprises a plurality of flip-flops connected in series between an input terminal and an output terminal and successively shifting data to be input to said input terminal to said output terminal in accordance with a common clock signal.

3. A semiconductor circuit as set forth in claim 2, wherein said mode key circuit is comprised of a plurality of flip-flops installed at predetermined positions of said scan path circuit.

4. A semiconductor circuit as set forth in claim 3, wherein
   when operating in a first operation mode, the flip-flops comprising said mode key circuit hold an input signal and output it to the output side; and
   when operating in a second operation mode, the flip-flops comprising said mode key circuit output logic inverted data of the held data.

5. A semiconductor circuit as set forth in claim 1, wherein
   said mode signal generation circuit comprises a data holding circuit for holding output data of said mode key circuit and a logical operation circuit for performing a predetermined logical operation on the held data of the above data holding circuit and outputting the calculation result as said mode signal.

6. A semiconductor circuit as set forth in claim 5, wherein:
   said data holding circuit comprises flip-flops for holding the output data of said mode key circuit,
   when operating in said first operation mode, said flip-flops hold the output data as they, and
   when operating in said second operation mode, said flip-flops fetch the output data of said mode key circuit.

7. A semiconductor circuit as set forth in claim 5, wherein said logical operation circuit comprises a plurality of exclusive OR circuits for obtaining an exclusive OR for the held data of said data holding circuit and an AND circuit for obtaining an AND of the output data of said exclusive OR circuits.

8. A semiconductor circuit as set forth in claim 1, wherein:
   said data conversion circuit comprises
   a plurality of flip-flops connected in series,
   a feedback circuit for performing a logical operation on the output data of a predetermined flip-flop among said plurality of flip-flops and inputting the calculation result to a first flip-flop, and
   an output circuit for outputting the output data of said scan path circuit as it is when said mode signal is in the one state, while outputting a logical operation result of the output data of said scan path circuit and the output data of any flip-flop among said plurality of flip-flops when said mode signal is in a state different from the one state.

9. A semiconductor circuit as set forth in claim 8, wherein said feedback circuit includes an exclusive OR circuit for obtaining an exclusive OR of the output data of said predetermined flip-flop.

10. A semiconductor circuit as set forth in claim 8, wherein said output circuit includes an exclusive OR circuit for obtaining an exclusive OR of the output data of said scan path circuit and the output of said any flip-flop.

* * * * *